Patented Dec. 2, 1941

2,264,928

UNITED STATES PATENT OFFICE 2,264,928

PRODUCTION OF OPTICALLY ACTIVE PIPERITONE

John William Blagden and Walter Edward Huggett, Ilford, England

No Drawing. Application October 14, 1938, Serial No. 235,282. In Great Britain October 25, 1937

16 Claims. (Cl. 260—587)

Piperitone occurs naturally in a larger number of essential oils, such as the Eucalyptus oils of different species and the grass oils—*Cymbopogon sennarensis* and *Andropogon Jwarancusa*. None of the known methods of extracting piperitone from these oils leads to a pure piperitone having its full optical activity and in some cases the isolated ketone has become completely racemised. Read and Smith (J. C. S. 1923, vol. 123, page 2268) record the following optical rotations for piperitone:

d-piperitone from *Andropogon Jwarancusa*:
$[\alpha]^{20}_D + 49.13°$ l-piperitone from *Eucalyptus dives*: $[\alpha]^{20}_D - 51.53°$ Simonsen ("The Terpenes," vol. 1, page 210) records d-piperitone $[\alpha]^{15}_D + 62.5°$
l-piperitone $[\alpha]^{15}_D - 53.9°$ By the present invention piperitone having a high optical activity is obtained by causing optically active piperitone to crystallise from a solvent. We have found that by exposing the optically active mixture, comprising l-piperitone, piperitone racemate and non-ketonic bodies, obtainable by fractional distillation or solvent extraction of the essential oil, to a temperature below about —40° C., the l-piperitone crystallises from the solvent non-ketonic bodies leaving the piperitone racemate in solution. The isolation of the crystals from the solution is not easy because of the high viscosity of the solution, but by lowering this viscosity by addition of a solvent of sufficiently low freezing point before the cooling operation or in a cooled condition after that operation, the solution can more readily be removed from the crystals, for instance by suction. Alternatively the crystals may be separated from a part of the solvent non-ketonic bodies and may then be washed with the cooled solvent of low freezing point to remove adherent non-ketonic bodies.

The operations of cooling and separation of the crystals may be repeated if required in order to yield a piperitone of maximum optical activity.

The following examples illustrate the invention:

1. *Eucalyptus dives* is fractionated under a pressure of 2 mm. The lower boiling phellandrenes are first removed and are followed by a fraction containing substantially all of the piperitone. According to analysis this fraction contains 92 per cent. of ketonic bodies; its optical rotation is $[\alpha]^{20}_D$(homogeneous) $= -49°$, the theoretical rotation calculated for the piperitone content being $[\alpha]^{20}_D = -53°$. This impure piperitone is mixed with 10 per cent. of its volume of petroleum ether (boiling range 60°–80° C.) and cooled to about —70° C. The piperitone separates as fine crystals from which the non-crystallisable portion is removed by suction. The crystals are allowed to melt. The piperitone so obtained has the optical rotation: $[\alpha]^{20}_D$(homogeneous) $= -62°$. Its melting point is —31° C. and its ketone content is 100 per cent. After two further crystallisations the piperitone has the following constants:

Melting point _____ —29° C.
Solidifying point _____ —32° C.
$n^{20}_D$ _____ 1.4845
$[\alpha]^{20}_D$(homogeneous) _____ 66°

2. *Eucalyptus dives* is extracted with a suitable solvent, for instance, aqueous methanol of 70 per cent. strength, which will extract the ketone but not the hydrocarbons. All the piperitone is thus separated but it is usually contaminated with 2 to 10 per cent. of non-ketonic bodies, probably sesquiterpenes. The impure ketone is suitably treated to remove traces of methanol and water and then diluted with 10 per cent. of its volume of petroleum ether and cooled to a temperature below about —40° C., whereby the piperitone crystallises. It has the optical rotation $[\alpha]^{20}_D = -62°$. Two further crystallisations yield piperitone having the same constants as the product of Example 1.

In the foregoing examples the proportion of petroleum ether may be increased, for instance, up to 40 per cent. by volume.

3. 500 parts by volume of impure piperitone obtained by fractionation of *Eucalyptus dives*, as used in Example 1, are cooled to about —50° C., whereby well defined crystals separate. The still liquid fraction is removed from the crystals as far as possible by filtration and the crystals are then washed as rapidly as possible with 100 parts by volume of petroleum ether (boiling range 60–80° C.) cooled to a temperature of —50° C. After removal of adherent petroleum ether, the piperitone thus obtained (about 254 parts by volume) has an optical rotation $[\alpha]^{20}_D = -57°$. It is again cooled to —50° C., the crystals formed are separated as far as possible from the non-crystallised portion by filtration with suction and then quickly washed with 100 parts by volume of petroleum ether (boiling range 60°–80° C.) cooled to —50° C. There are obtained about 170 parts by volume of piperitone having an optical rotation $[\alpha]^{20}_D = -61.2°$. The operations of cooling and washing the crystals with cooled petroleum ether may be repeated in order to obtain a product having a still higher optical rotation.

Instead of petroleum ether there may be used other solvents of sufficiently low freezing point, preferably one in which the piperitone is not too freely soluble.

The purified l-piperitone so obtained is an important parent material for the manufacture of optically active menthones and menthols.

Having thus described the nature of the said invention and the best means we know of carrying the same into practical effect, we claim:

1. A process of separating laevo-piperitone from a mixture containing laevo-piperitone and piperitone racemate, which comprises cooling the mixture in presence of a solvent for piperitone to a temperature at which crystallization occurs and separating the crystals from the liquid.

2. A process of separating laevo-piperitone from the optically active mixture comprising laevo-piperitone, piperitone racemate and non-ketonic bodies constituting a solvent for piperitone, which mixture is obtainable from essential oils containing laevo-piperitone, which comprises cooling the mixture to a temperature at which crystallization occurs and separating the crystals from the liquid.

3. A process of separating laevo-piperitone from the optically active mixture comprising laevo-piperitone, piperitone racemate and non-ketonic bodies constituting a solvent for piperitone, which mixture is obtainable from essential oils containing laevo-piperitone, which comprises adding a liquid of low freezing point which is a solvent for piperitone to the mixture, cooling the whole to a temperature at which crystallization occurs and separating the crystals from the liquid.

4. A process of separating laevo-piperitone from the optically active mixture comprising laevo-piperitone, piperitone racemate and non-ketonic bodies constituting a solvent for piperitone, which mixture is obtainable from essential oils containing laevo-piperitone, which comprises cooling the mixture to a temperature at which crystallization occurs, adding a liquid of low freezing point which is a solvent for piperitone in cooled condition and separating the crystals from the liquid.

5. A process of separating laevo-piperitone from the optically active mixture comprising laevo-piperitone, piperitone racemate and non-ketonic bodies constituting a solvent for piperitone, which mixture is obtainable from essential oils containing laevo-piperitone, which comprises cooling the mixture to a temperature at which crystallization occurs, separating the crystals from a part of the liquid and then removing the remainder of the liquid by washing the crystals with a liquid of low freezing point which is a solvent for piperitone in cooled condition.

6. A process of separating laevo-piperitone from a mixture containing laevo-piperitone and piperitone racemate, which comprises cooling the mixture in presence of a solvent for piperitone to a temperature below minus 40° C. and separating the crystals which have formed from the liquid.

7. A process of separating laevo-piperitone from the optically active mixture comprising laevo-piperitone, piperitone racemate and non-ketonic bodies constituting a solvent for piperitone, which mixture is obtainable from essential oils containing laevo-piperitone, which comprises cooling the mixture to a temperature below minus 40° C. and separating the crystals which have formed from the liquid.

8. A process of separating laevo-piperitone from the optically active mixture comprising laevo-piperitone, piperitone racemate and non-ketonic bodies constituting a solvent for piperitone, which mixture is obtainable from essential oils containing laevo-piperitone, which comprises adding a liquid of low freezing point which is a solvent for piperitone to the mixture, cooling the whole to a temperature below minus 40° C. and separating the crystals which have formed from the liquid.

9. A process of separating laevo-piperitone from the optically active mixture comprising laevo-piperitone, piperitone racemate and non-ketonic bodies constituting a solvent for piperitone, which mixture is obtainable from essential oils containing laevo-piperitone, which comprises cooling the mixture to a temperature below minus 40° C., adding a liquid of low freezing point which is a solvent for piperitone cooled to a temperature such that the temperature of the whole remains below minus 40° C. and separating the crystals which have formed from the liquid.

10. A process of separating laevo-piperitone from the optically active mixture comprising laevo-piperitone, piperitone racemate and non-ketonic bodies constituting a solvent for piperitone, which mixture is obtainable from essential oils containing laevo-piperitone, which comprises cooling the mixture to a temperature below minus 40° C., separating the crystals which have formed from a part of the liquid and then removing the remainder of the liquid by washing the crystals with a liquid of low freezing point which is a solvent for piperitone cooled to a temperature below minus 40° C.

11. A process of separating laevo-piperitone from the optically active mixture comprising laevo-piperitone, piperitone racemate and non-ketonic bodies constituting a solvent for piperitone, which mixture is obtainable from essential oils containing laevo-piperitone, which comprises adding petroleum ether to the mixture, cooling the whole to a temperature at which crystallization occurs and separating the crystals from the liquid.

12. A process of separating laevo-piperitone from the optically active mixture comprising laevo-piperitone, piperitone racemate and non-ketonic bodies constituting a solvent for piperitone, which mixture is obtainable from essential oils containing laevo-piperitone, which comprises cooling the mixture to a temperature at which crystallization occurs, adding petroleum ether in cooled condition and separating the crystals from the liquid.

13. A process of separating laevo-piperitone from the optically active mixture comprising laevo-piperitone, piperitone racemate and non-ketonic bodies constituting a solvent for piperitone, which mixture is obtainable from essential oils containing laevo-piperitone, which comprises cooling the mixture to a temperature at which crystallization occurs, separating the crystals from a part of the liquid and then removing the remainder of the liquid by washing the crystals with petroleum ether in cooled condition.

14. A process of separating laevo-piperitone from the optically active mixture comprising laevo-piperitone, piperitone racemate and non-ketonic bodies constituting a solvent for piperitone, which mixture is obtainable from essential oils containing laevo-piperitone, which comprises adding petroleum ether to the mixture, cooling the whole to a temperature below minus 40° C.

and separating the crystals which have formed from the liquid.

15. A process of separating laevo-piperitone from the optically active mixture comprising laevo-piperitone, piperitone racemate and non-ketonic bodies constituting a solvent for piperitone, which mixture is obtainable from essential oils containing laevo-piperitone, which comprises cooling the mixture to a temperature below minus 40° C., adding petroleum ether cooled to a temperature such that the temperature of the whole remains below minus 40° C. and separating the crystals which have formed from the liquid.

16. A process of separating laevo-piperitone from the optically active mixture comprising laevo-piperitone, piperitone racemate and non-ketonic bodies constituting a solvent for piperitone, which mixture is obtainable from essential oils containing laevo-piperitone, which comprises cooling the mixture to a temperature below minus 40° C., separating the crystals which have formed from a part of the liquid and then removing the remainder of the liquid by washing the crystals with petroleum ether cooled to a temperature below minus 40° C.

JOHN WILLIAM BLAGDEN.
WALTER EDWARD HUGGETT.